(12) United States Patent
Schiele

(10) Patent No.: US 10,088,037 B2
(45) Date of Patent: Oct. 2, 2018

(54) HYDRAULIC CONTROL DEVICE FOR AN AUTOMATIC TRANSMISSION

(71) Applicant: ZF Friedrichshafen AG, Friedrichshafen (DE)

(72) Inventor: Peter Schiele, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 144 days.

(21) Appl. No.: 15/185,651

(22) Filed: Jun. 17, 2016

(65) Prior Publication Data

US 2016/0369890 A1 Dec. 22, 2016

(30) Foreign Application Priority Data

Jun. 19, 2015 (DE) .................. 10 2015 211 322

(51) Int. Cl.
| | |
|---|---|
| *F16H 61/06* | (2006.01) |
| *F16H 61/02* | (2006.01) |
| *F16H 61/00* | (2006.01) |
| *F15B 15/14* | (2006.01) |

(52) U.S. Cl.
CPC ......... *F16H 61/0267* (2013.01); *F15B 15/14* (2013.01); *F16H 61/0021* (2013.01); *F16H 61/0031* (2013.01)

(58) Field of Classification Search
CPC .............................. F16H 61/06; F16H 61/065
See application file for complete search history.

(56) References Cited

U.S. PATENT DOCUMENTS

| | | | | |
|---|---|---|---|---|
| 3,687,152 A | * | 8/1972 | Osaka ................... | B60T 11/224 137/115.16 |
| 3,991,865 A | * | 11/1976 | Komatsu ............. | F16D 48/0206 137/116.3 |
| 4,560,047 A | * | 12/1985 | McCarthy ............. | F16D 48/066 137/596.16 |
| 5,823,313 A | * | 10/1998 | Bohner ................. | F16H 61/065 192/109 F |
| 6,544,139 B1 | | 4/2003 | Gierer et al. | |

(Continued)

FOREIGN PATENT DOCUMENTS

| | | |
|---|---|---|
| DE | 19858541 A1 | 6/2000 |
| DE | 19961796 C1 | 9/2001 |

(Continued)

OTHER PUBLICATIONS

German Search Report DE102015211322.1, dated Mar. 16, 2016. (7 pages).

*Primary Examiner* — Tisha D Lewis
(74) *Attorney, Agent, or Firm* — Dority & Manning, P.A.

(57) ABSTRACT

A hydraulic control device for an automatic transmission for a motor vehicle includes a shiftable throttle valve allocated to one or more shift elements of a plurality of hydraulically actuated shift elements. The shiftable throttle valve hydraulically connects a respective pressure-adjusting device of the one or more shift elements to a respective clutch cylinder of the one or more shift elements. The shiftable throttle valve is shiftable into at least a first shift position and a second shift position. A hydraulic resistance between a hydraulic transmission controller and the one or more shift elements of the plurality of hydraulically actuated shift elements is larger in the second shift position relative to the first shift position.

10 Claims, 2 Drawing Sheets

(56) References Cited

U.S. PATENT DOCUMENTS

| | | | |
|---|---|---|---|
| 6,553,857 B2* | 4/2003 | Sporl | ............... F15B 1/033 192/3.54 |
| 2015/0133265 A1 | 5/2015 | Sohler et al. | |
| 2016/0230880 A1 | 8/2016 | Beck et al. | |

FOREIGN PATENT DOCUMENTS

| | | |
|---|---|---|
| DE | 102006014756 A1 | 10/2007 |
| DE | 102013221038 A1 | 4/2015 |
| DE | 102013222811 A1 | 5/2015 |
| WO | WO 2015055366 A2 | 4/2015 |

* cited by examiner

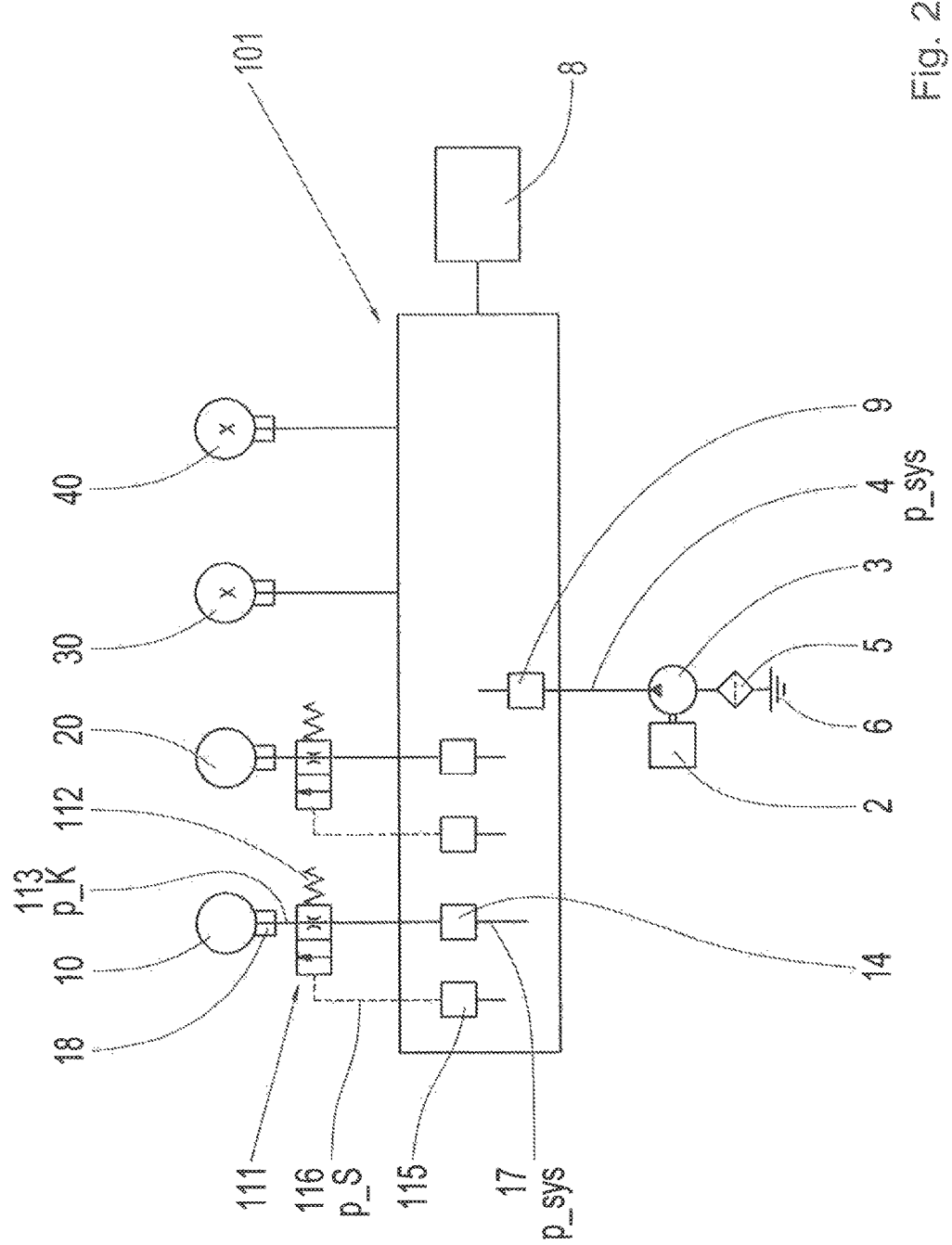

HYDRAULIC CONTROL DEVICE FOR AN AUTOMATIC TRANSMISSION

FIELD OF THE INVENTION

The invention relates generally to a hydraulic control device for an automatic transmission and a method for operating a hydraulic control device.

BACKGROUND

In automatic transmissions for motor vehicles, such as known (for example) from DE19858541A1, the transmission ratio stages are adjusted by hydraulically actuated shift elements, hereinafter also referred to as "clutches." Clutches may connect both two rotatable elements together, and one element connected in a torque-proof manner to the transmission housing to one rotatable element. In the latter case, one also speaks of a brake. Thereby, the shifting elements are formed as frictional-locking multi-disk clutches. In the automatic transmission disclosed in DE19858541A1, six transmission ratio stages are adjustable for forward travel, whereas, for the presentation of each transmission ratio stage, three shift elements must be closed simultaneously.

With known automatic transmissions, actuation (i.e., the closing of the shift elements for the transfer of torque) takes place hydraulically, i.e. by actuation devices in the form of piston-cylinder units, which are subjected to a pressure medium, typically transmission oil, and convert hydraulic energy into mechanical energy. Such a piston-cylinder unit is also referred to as a "clutch cylinder." A clutch pressure chamber is formed from the piston and the cylinder; for the actuation of the shift element, this is subjected to transmission oil that is under actuating pressure or clutch pressure. Under the action of the pressure, the piston is typically pressed against a multi-disk pack counter to the force of a return spring, which makes these two components connected to each other in a torque-proof manner. If the pressurization of a shift element is referred to below, it will be understood that the pressurization of the clutch cylinder or the clutch pressure chamber that is encompassed by the shift element is provided.

The pressure oil is conveyed by a motor-driven transmission pump as a pressure source. The actuating pressure is adjusted by a pressure-adjusting device of a hydraulic transmission controller. By the hydraulic transmission controller or its pressure control devices, it is also possible to reduce the actuating pressure to ambient pressure, by which the clutch pressure chamber is pressureless and a force effect on the piston is no longer present. A pressureless clutch cylinder is also designated as "vented."

In particular, with frictional-locking shift elements, the actuating pressure needs to be maintained at a pressure level that produces a pressing force of the multi-disks in the shift element that is sufficient for the transfer of torque during the entire actuation period.

With the aim of reducing fuel consumption, or the reduction of carbon dioxide emissions, various methods for operating a vehicle drive, comprising a drive motor and a transmission, are used. The drive motor is typically an internal combustion engine. A known measure is the so-called "start-stop operation."

In a variant of a start-stop operation disclosed in DE19961796C1, the internal combustion engine is switched off, for example, when the vehicle is coasting and a vehicle standstill is imminent. By switching off the internal combustion engine, the transmission pump would also be stationary, such that the conveying of the operating medium or the production of pressure, as the case may be, would collapse in the entire hydraulic system. Thereby, the lubrication of the transmission components rotating while coasting would no longer be ensured, which would lead to increased wear or damages to the relevant components. An insufficient supply of lubricating oil, particularly in the bearings, may lead to damages to and ultimately the failure of the transmission. For this reason, with known automatic transmissions, an additional auxiliary pressure source is provided for such conditions, which may provide a volume flow of an operating medium under pressure, and thus take over the oil supply of the automatic transmission when the transmission pump is stationary. Such an auxiliary pressure source may be formed, for example, as an electrically driven pump in DE19961796C1. An alternative auxiliary pressure source would be a pressure accumulator, which is known from DE102006014756A1 of the applicant. The provision of an auxiliary pressure source disadvantageously means a considerable expense of costs and weight, and requires additional installation space. In addition, with the use of an electrically driven transmission pump, software-based measures for creating an emergency strategy may be necessary in the event that the electrically driven transmission pump fails.

SUMMARY OF THE INVENTION

Exemplary aspects of the invention provide a hydraulic control device for an automatic transmission, which, with a simple structure, ensures the lubricating oil supply of the transmission upon coasting with a switched-off internal combustion engine. In particular, additional auxiliary pressure sources, such as an electrically driven auxiliary pump, may be dispensed with.

Accordingly, a hydraulic control device for an automatic transmission for a motor vehicle comprises multiple hydraulically actuated shift elements with one clutch cylinder each, whereas the clutch cylinders convert hydraulic energy into mechanical energy for the actuation of the shift elements. Furthermore, the hydraulic control device comprises at least one hydraulic shift device, which features pressure-adjusting devices for adjusting the pressure in the respective clutch cylinder. A pressure-adjusting device is allocated to each shift element or its clutch cylinder. The hydraulic control device is supplied by a transmission pump with a volume flow of an operating medium and hydraulic energy for producing pressure.

In accordance with exemplary aspects of the invention, the hydraulic control device comprises at least one shiftable throttle valve, whereas a shiftable throttle valve is allocated to one or more shift elements. The shiftable throttle valve is arranged between the shift element allocated to it and the pressure-adjusting device allocated to the shift element, such that, by the shiftable throttle valve, the respective pressure-adjusting device is hydraulically connected to the clutch cylinder of the shift element allocated to it. Thereby, the shiftable throttle valve is shiftable into at least one first shift position and one second shift position, whereas, in the second shift position, the hydraulic resistance between the hydraulic transmission controller and the shift element is larger than it is in the first shift position. The different hydraulic resistances, which are also referred to as throttles, have the advantage that, on the one hand with a higher hydraulic resistance, the drainage time of a pressure medium from the clutch cylinder, or the time until the clutch pressure prevailing in the clutch cylinder has reduced to a certain lower pressure and ambient pressure, can be extended. Conversely, a lesser hydraulic resistance in the first shift position is necessary if, upon a change to the transmission ratio stage, the clutch cylinder is to be filled quickly. The first shift position is also referred to as an unthrottled shift position and the second shift position is also referred to as a throttled shift position.

In a preferred exemplary arrangement of the invention, it is possible that the hydraulic control device comprises an actuating device, by which the shiftable throttle valve is shiftable between two shift positions, whereas the actuating device is formed in such a manner that, upon a standstill of the transmission pump or the pressure reduction in the hydraulic transmission controller associated with it, the shiftable throttle valve automatically assumes the second shift position or remains in it if the shiftable throttle valve was previously located in the second shift position. Through the automatic switching of the shiftable throttle valve into the throttled shift position, upon a standstill of the transmission pump it is advantageously ensured that the lubricating circuit is supplied.

In an additional exemplary arrangement, it is provided that the hydraulic transmission controller is connected to its supply with a lubricating oil branch and is formed in such a manner that the oil volume flowing from the clutch cylinder through the shiftable throttle valve into the hydraulic shift device can be fed to the lubricating oil branch of the hydraulic control device. Thereby, the shiftable throttle valve is formed in such a manner that, in the first shift position, the hydraulic resistance is as low as possible, and that, in the second shift position, the hydraulic resistance is so high that, after the standstill of the transmission pump in the case of a previously pressurized clutch cylinder, the reduction of the clutch pressure in the clutch cylinder, and thus the outflow of operating medium from the clutch cylinder, takes place slowly over time in such a manner that, advantageously, the supply of the lubricating oil branch is ensured during the coasting process.

In an advantageous exemplary arrangement of the invention, it is provided that the actuating device is formed as a control pressure valve and that the shiftable throttle valve is shiftable into the first shift position by a hydraulic control pressure switched on by the control pressure valve and is shiftable into the second shift position by the force of a spring, if the control pressure falls below a certain value.

With an alternative arrangement of this, the shiftable throttle valve is shiftable into the second shift position (also referred to as a "throttled shift position") by a hydraulic control pressure, and is shiftable into the first, unthrottled shift position by the force of a spring, if the control pressure falls below a certain value.

In one exemplary arrangement of the invention, multiple shiftable throttle valves can be actuated by only one control pressure valve. This solution has advantages in terms of installation space and costs.

Alternatively, it is possible that a control pressure valve is allocated to each shiftable throttle valve for its actuation. Thereby, each shiftable throttle valve can be controlled individually.

In an alternative to an actuating device as a control pressure valve, it is possible that the actuating device is formed as an electromagnet, by which the shiftable throttle valve is shiftable into at least one of the two shift positions through the action of an electromagnetic actuating force.

In an exemplary additional preferred alternative, it is possible that the actuating device of the shiftable throttle valve is a system pressure valve of the hydraulic transmission controller, by which a system pressure to be produced by the transmission pump is adjustable, whereas the control pressure line is connected to a line of the hydraulic transmission controller, in which the system pressure prevails, such that the shiftable throttle valve is shiftable into the first, unthrottled shift position by the system pressure and is shiftable into the second, throttled shift position by the force of a spring, if the system pressure falls below a certain value when the transmission pump discontinues its operation. With this solution, at least one separate control pressure valve can be spared, which signifies advantages in terms of costs and installation space.

Advantageously, it is possible that an automatic transmission features a hydraulic control device according to any one of the preceding arrangements. It is thereby possible to switch off the internal combustion engine prior to coasting into an imminent standstill, and thus lower fuel consumption and reduce carbon dioxide emissions.

An exemplary method for operating a hydraulic control device with an electromagnet as an actuating device for the shiftable throttle valve may be indicated, with which the electromagnet moves the shiftable throttle valve into the throttled shift position, if it is determined by a detection device that the transmission pump has come to a standstill and/or that the pressure measured on the pressure side of the transmission pump has fallen below a certain minimum value. Thereby, the preferred minimum value is the ambient pressure or a pressure that approximately corresponds to the ambient pressure. Thereby, the ambient pressure corresponds to the air pressure of the environment and accordingly is approximately one (1) bar.

Thereby, in an additional arrangement, a sensor system would be required to detect when the transmission pump has discontinued its operations. This could be effected, for example, by detecting the rotational speed of the transmission pump or by measuring the system pressure.

BRIEF DESCRIPTION OF THE DRAWINGS

Embodiments are shown in the drawings and are described in more detail below.

The following is shown:

FIG. 2 a schematic presentation of a hydraulic control device in accordance with exemplary aspects of the invention.

DETAILED DESCRIPTION

Figure 1:
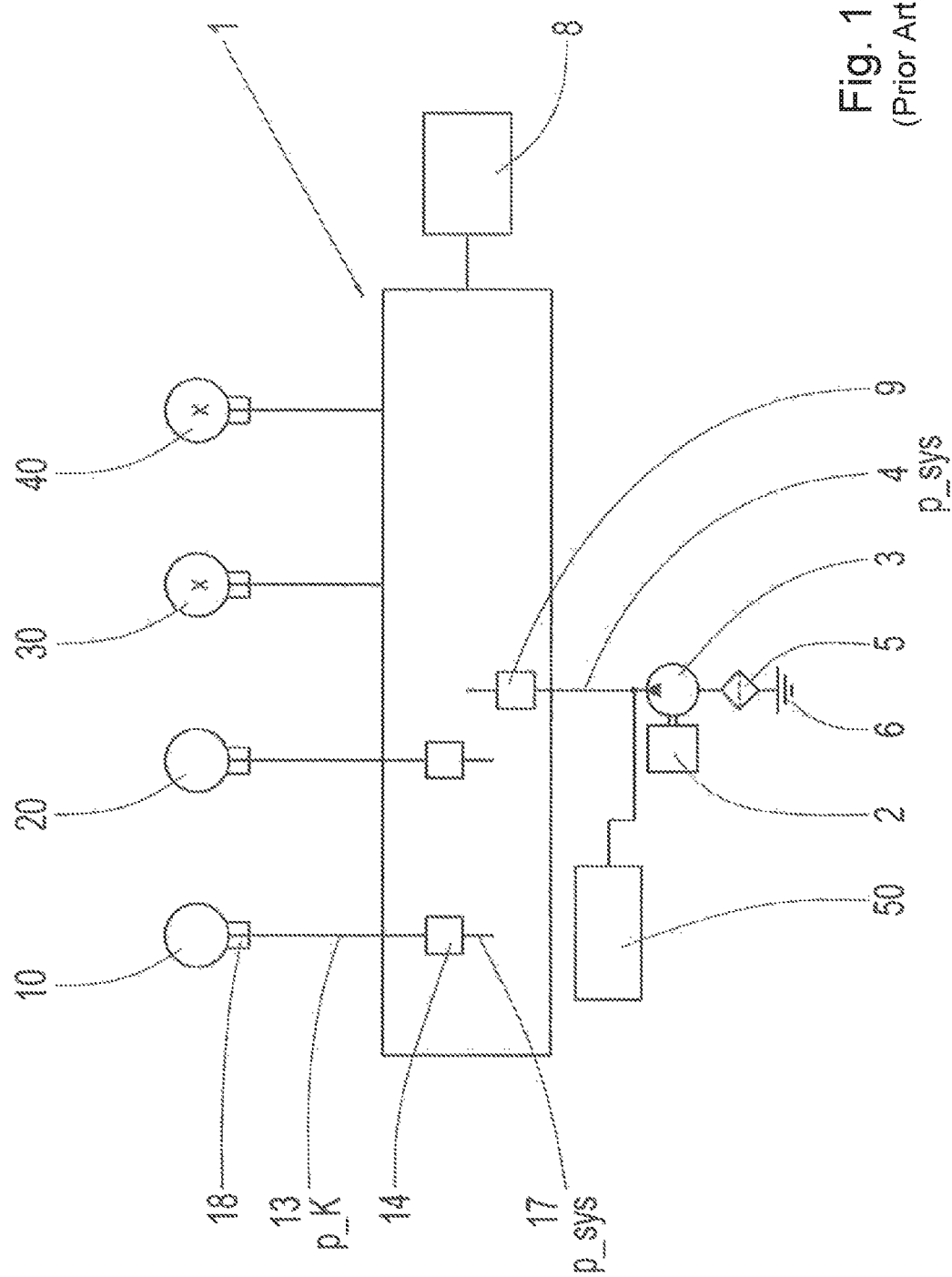
FIG. 1 a schematic presentation of a hydraulic control device according to the state of the art.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a hydraulic control device according to the state of the art for an automatic transmission. It comprises hydraulically actuated shift elements 10, 20, 30 and 40, and a hydraulic transmission controller 1. Multiple valve devices, which are designed as hydraulically or electrically controlled valves, are arranged within the hydraulic transmission controller 1. For reasons of a clear presentation, the elements allocated to one shift element are shown as examples for the shift element 10.

The shift element 10 features a clutch cylinder 18, by which it can be actuated by a hydraulic clutch pressure p_K. A pressure control device 14, which adjusts the clutch pressure p_K, is allocated to the clutch cylinder 18. A pressure-adjusting device for adjusting the respective clutch pressure is also allocated to each additional shift element or its clutch cylinder, as the case may be.

From a transmission pump 3, the hydraulic transmission controller 1 is provided through a supply line 4 with an operating medium, preferably transmission oil. The transmission pump 3 is driven by an internal combustion engine 2, which also serves to drive the motor vehicle.

In the operation of the automatic transmission (i.e., with a running internal combustion engine), the transmission pump 3 produces a system pressure p_sys, which prevails both in the supply line 4 and in a system pressure line 17 within the hydraulic transmission controller 1 and the amount of which is adjusted by a system pressure valve 9. Thus, the system pressure p_sys is the highest pressure in the entire hydraulic system of the transmission.

Within the hydraulic transmission controller 1, different required pressure values are adjusted through the reduction of the system pressure p_sys by various valve devices. Thus, for example, the pressure-adjusting device 14 adjusts the clutch pressure p_K, which acts on the clutch cylinder 18, and thus includes the shift element 10 for the presentation of a transmission ratio stage.

The transmission oil is sucked in by the transmission pump 3 through a suction filter 5 from a transmission oil reservoir, which is also referred to as a transmission oil sump 6. In a connection 7 in the supply line 4, an auxiliary pressure source 50 is attached, and is thereby connected to the hydraulic transmission controller 1. A check valve (not shown) in the supply line 4 may be provided between the connector 7 and the transmission pump 3; this prevents the flow-through of the transmission pump 3 from the auxiliary pressure source 50 in the direction of the transmission oil sump 6, if the auxiliary pressure source 50 is in operation and the transmission pump 3 is stationary.

The pressure-adjusting device 14 is supplied by a system pressure line 17, in which, for example, the system pressure p_sys produced by the transmission pump 3 prevails. Through a clutch pressure line 13, in which the clutch pressure p_K adjusted by the pressure-adjusting device 14 prevails, the pressure-adjusting device 14 is connected to the clutch cylinder 18 of the shift element 10.

By the pressure-adjusting device 14, the clutch pressure p_K is variable between a maximum value, which corresponds to the system pressure p_sys itself, and the pressure upon the emptying of the shift element as a minimum value. The clutch cylinder 18 of the shift element 10 is thereby emptied by connecting the clutch pressure line 13 by the pressure-adjusting device 14 with an area in which ambient pressure prevails, such as the transmission oil sump 6.

With the adjusting of pressures in the valve devices within the transmission controller 1, volume flows at a pressure level that is significantly below the system pressure p_sys arise. The valve devices and its channels are arranged within the hydraulic transmission controller in such a manner that the volume flows are fed to a lubricating oil branch 8. The lubricating oil branch 8 includes bearings (for example), which have to be lubricated or cooled in order to avoid wear.

With the aim of reducing fuel consumption and thus carbon dioxide emissions, there are certain methods, such as a drive system, for operating a motor vehicle. One option is to switch off the internal combustion engine when it is not needed to drive the motor vehicle, such as (for example) when the motor vehicle is at a standstill or coasting up to standstill. Typically, the transmission pump is driven by the drive motor, for example an internal combustion engine of the motor vehicle, which is stationary when the internal combustion engine is switched off. Thereby, the pressure in the entire hydraulic system of the automatic transmission drops to ambient pressure, and volume flows no longer flow to the lubricating oil branch. Thus, the bearings of the components rotating when the motor vehicle is coasting may no longer be lubricated, such that this can lead to transmission damages.

For this reason, the auxiliary pressure source 50 is provided, from which, in operating conditions with a switched-off internal combustion engine and thus a stationary transmission pump, transmission oil is conveyed through the supply line 4 into the hydraulic transmission controller 1, and thus also reaches the lubricating oil branch 8. The auxiliary pressure source 50 may be formed (for example) as an electrically driven pump or a hydraulic accumulator. Both arrangements represent a considerable expense of costs and require additional installation space. In addition, there is a risk of transmission damages if the electrically driven pump should fail, such that a high effort is required to develop emergency strategies for such an event.

FIG. 2 shows a schematic presentation of a hydraulic control device in accordance with exemplary aspects of the invention. In contrast to the hydraulic control device according to the state of the art of FIG. 1, this features a hydraulic transmission controller 101 and a shiftable throttle valve 111. In order to simplify the description, a designation is made of only the shiftable throttle valve 111 that is allocated to the shift element 10 and is connected by a clutch pressure line 113 to the clutch cylinder 18 of the shift element 10. In the exemplary embodiment of FIG. 2, a shiftable throttle valve is also arranged between the shift element 20 and the hydraulic transmission controller 101, whereas, theoretically, a shiftable throttle valve may be allocated to each shift element.

In the exemplary embodiment in FIG. 2, in the hydraulic transmission controller 101, in addition to the pressure-adjusting device 14 for adjusting the clutch pressure p_K, a control pressure valve 115 for actuating (i.e., shifting) the shiftable throttle valve 111 between at least two shift positions is provided. Alternatively, the actuation of the shiftable throttle valve may also take place electro-mechanically by an electromagnet. In the present exemplary embodiment, the shiftable throttle valve 111 is formed as a 2/2-way valve, since it features two connectors and is shiftable into two shift positions. One of the two connectors connects the shiftable throttle valve 111 to the clutch cylinder 18 of the shift element 10.

The other connector connects the shiftable throttle valve 111 to the transmission controller 101 or the pressure-adjusting device 14, as the case may be.

In a first shift position of the control pressure valve 115, a control pressure p_S produced in the hydraulic transmission controller 101, which may correspond (for example) to the system pressure p_sys, is applied to the shiftable throttle valve 111 through a control pressure line 116, which is shifted into a first shift position counter to the force of a spring 112, in which an inflow of the operating medium into the clutch cylinder 18 of the shift element 10 that is as unhindered as possible can take place upon its filling for shifting a transmission ratio stage. The first shift position of the shiftable throttle valve is also referred to as an "unthrottled shift position." Thereby, the shiftable throttle valve 111 is formed in such a manner that its flow resistance in the unthrottled shift position is as low as possible. In a second shift position of the control pressure valve 115 or upon the standstill of the transmission pump 3, the control pressure line 116 is pressureless, such that the shiftable throttle valve 111 is moved by the force of the spring 112 into a second shift position. In this shift position, also referred to as a throttled shift position, the flow resistance is clearly increased compared to the first shift position by the shiftable throttle valve 111; i.e., in the throttled shift position, the shiftable throttle valve 111 constitutes a throttle or an aperture between the clutch cylinder 18 and the pressure-adjusting device 14.

The control pressure p_S acts by the control pressure line 116 on the shiftable throttle valve 111, and holds it in the unthrottled shift position. If the stopping of the motor vehicle is now imminent, the internal combustion engine 2 is switched off during coasting, by which the transmission pump 3 comes to a standstill, and the system pressure p_sys produced by this reduces to the level of the ambient pressure. The control pressure p_S fed by the system pressure p_sys decreases with this, such that the shiftable throttle valve 111 is moved into the throttled shift position under the action of the spring 112. Due to the flow resistance of the throttle, the oil volume is initially retained in the shifted clutch, and the emptying of the shift element 10, and thus the reduction in the clutch pressure p_K, are delayed over time. As mentioned above, the shift element is typically provided with a piston return spring, which is not shown. After a pressure drop in the clutch pressure line 113 below the pressure that is produced by the return spring, a pushing out of the oil volume from the shift element 10 is carried out through the throttle point of the shiftable throttle valve 111 into the hydraulic transmission controller 101.

In an alternative exemplary arrangement, the control pressure valve 115 as an actuating device for the shiftable throttle valve 111 is omitted. Instead of this, the system pressure valve 9 is the actuating device, by connecting the control pressure line 116 to a line of the hydraulic transmission controller 101, which is under the system pressure p_sys produced directly by the transmission pump 3, such as, for example, the supply line 4 or the system pressure line 17. Thus, the shiftable throttle valve 111 is in the unthrottled shift position as soon as the transmission pump 3 is in operation and a system pressure p_sys is thus produced. The control pressure p_S then corresponds to the system pressure p_sys. If, upon the switching off of the internal combustion engine 2, the transmission pump 3 comes to a standstill, the system pressure p_sys is reduced to ambient pressure and the shiftable throttle valve 111 is moved into the throttled shift position under the action of the force of the spring 112.

The hydraulic transmission controller 101 is formed in such a manner that the volume may be accordingly redistributed to the lubricating oil branch 8 for the lubrication and/or cooling of the transmission. As described above, in an automatic transmission, multiple shift elements are typically involved for the presentation of a transmission ratio stage, whereas a shiftable throttle valve may be provided for each shift element, or for at least more than one shift element. Through such an accumulation, the stored volume that is available for feeding into the lubricating oil branch upon the standstill of the internal combustion engine can be significantly increased.

In the exemplary embodiment shown, each shiftable throttle valve 111 is actuated by a control pressure valve 115 allocated to it. However, it would also be possible to shift all shiftable throttle valves of a hydraulic control device collectively with only one central control pressure valve. This would have the advantage of a lower construction expense and lower costs. With both variants, the shiftable throttle valves are, upon the standstill of the internal combustion engine and the transmission pump, shifted into the throttled shift position under the action of the respective spring 112.

Theoretically, however, it would also be possible if the shiftable throttle valve 111 would be shifted into the throttled shift position after the filling and pressurization of the shift element 10. For the effect of the shiftable throttle valve, it is irrelevant whether this is brought into the throttled shift position only upon the standstill of the internal combustion engine or the transmission pump, as the case may be, or is already in this position.

The hydraulic control device may be combined with transmissions with a pressure accumulator or a shiftable volume accumulator or an even an electrically driven auxiliary pump, by which, upon the start of the engine, a particularly rapid switching from the throttled shift position into the unthrottled shift position for the rapid refilling of the clutches can take place. Shiftable throttle valves may also be presented in reverse operation; that is, the shiftable throttle valve is formed in such a manner that it is in the unthrottled shift position when no control pressure is applied to it. This has advantages in terms of functional security. However, this structural form is only sensible if at least one minimum pressure for controlling the shiftable throttle valves, or for holding them in the throttled shift position while the internal combustion engine is at a standstill, is maintained or produced by an electrically driven auxiliary pump or a pressure accumulator for the discharge period of the oil volume from the clutch.

Modifications and variations can be made to the embodiments illustrated or described herein without departing from the scope and spirit of the invention as set forth in the appended claims.

REFERENCE SIGNS

1 Hydraulic control device
2 Internal combustion engine
3 Transmission pump
4 Supply line
5 Suction filter
6 Oil sump
8 Lubricating oil branch
9 System pressure valve
10 Shift element
13 Clutch pressure line
14 Pressure-adjusting device
17 System pressure line
18 Clutch cylinder
20 Shift element
30 Shift element
40 Shift element
50 Auxiliary pressure source
101 Hydraulic control device
111 Shiftable throttle valve
112 Spring
113 Clutch pressure line
115 Control pressure valve
116 Control pressure line
p_K Clutch pressure
p_S Control pressure
p_sys System pressure)

The invention claimed is:

1. A hydraulic control device for an automatic transmission, comprising:
   a hydraulic transmission controller;
   a transmission pump operable to provide a flow of a pressurized fluid to the hydraulic transmission controller;
   a plurality of hydraulically actuated shift elements, each shift element of the plurality of hydraulically actuated shift elements having a clutch cylinder and a pressure-adjusting device, the pressure-adjusting device being a valve; and
   a shiftable throttle valve allocated to one or more shift elements of the plurality of hydraulically actuated shift elements, the shiftable throttle valve arranged between the respective clutch cylinder of the one or more shift elements and the respective pressure-adjusting device of the one or more shift elements, the shiftable throttle valve hydraulically connecting the respective pressure-adjusting device of the one or more shift elements to the respective clutch cylinder of the one or more shift elements,
   wherein the shiftable throttle valve is shiftable into at least a first shift position and a second shift position, a hydraulic resistance between the hydraulic transmission controller and the one or more shift elements of the plurality of hydraulically actuated shift elements being larger in the second shift position relative to the first shift position.

2. The hydraulic control device of claim 1, further comprising an actuating device operable to shift the shiftable throttle valve between the first and second shift positions, the actuating device formed such that the shiftable throttle valve automatically assumes the second shift position or remains in the second shift position when the transmission pump is at a standstill or when a system pressure within the hydraulic transmission controller falls below a pressure threshold.

3. The hydraulic control device of claim 2, wherein:
   the hydraulic transmission controller is connected to a lubricating oil branch such that fluid flowing from the respective clutch cylinder of the one or more shift elements through the shiftable throttle valve into the hydraulic transmission controller is receivable by the lubricating oil branch,
   the first shift position is an unthrottled shift position and the second shift position is a throttled shift position,
   the shiftable throttle valve formed such that the hydraulic resistance is minimized in the first, unthrottled shift position;
   the shiftable throttle valve also formed such that, after the standstill of the transmission pump when the respective clutch cylinder of the one or more shift elements is pressurized, the hydraulic resistance in the second, throttled shift position reduces a clutch pressure in the respective clutch cylinder of the one or more shift elements and the fluid flows from the respective clutch cylinder of the one or more shift elements over a period of time with the lubricating oil branch receiving the fluid from the hydraulic transmission controller.

4. The hydraulic control device of claim 3, wherein the actuating device is a control pressure valve, the shiftable throttle valve shiftable into the first shift position by a hydraulic control pressure switched on by the control pressure valve, the shiftable throttle valve shiftable into the second shift position by a spring when the hydraulic control pressure falls below the pressure threshold.

5. The hydraulic control device of claim 4, further comprising at least one additional shiftable throttle valve, the control pressure valve operable to actuate the shiftable throttle valve and the at least one additional shiftable throttle valve.

6. The hydraulic control device of claim 4, further comprising at least one additional shiftable throttle valve and at least one additional control pressure valve, each of the at least one additional control pressure valve operable to actuate a respective one of the at least one additional shiftable throttle valve.

7. The hydraulic control device of claim 3, wherein the actuating device is an electromagnet, the shiftable throttle valve shiftable into at least one of the first and second shift positions by an electromagnetic actuating force of the electromagnet.

8. A method for actuating a hydraulic control device of claim 7, comprising moving shiftable throttle valve into the second shift position with the electromagnet when the transmission pump is at the standstill or when a system pressure within the hydraulic transmission controller falls below the pressure threshold.

9. The hydraulic control device of claim 3, wherein the actuating device is a system pressure valve of the hydraulic transmission controller, a system pressure produced by the transmission pump adjustable with the system pressure valve, a control pressure line is connected to a line of the hydraulic transmission controller at the system pressure, the shiftable throttle valve shiftable into the first shift position by the system pressure, the shiftable throttle valve shiftable into the second shift position by a spring when the transmission pump is at the standstill or when a system pressure within the hydraulic transmission controller falls below the pressure threshold.

10. A motor vehicle, comprising:
    an automatic transmission; and
    a hydraulic control device, the hydraulic control device comprising
       a hydraulic transmission controller;
       a transmission pump operable to provide a flow of a pressurized fluid to the hydraulic transmission controller;
       a plurality of hydraulically actuated shift elements, each shift element of the plurality of hydraulically actuated shift elements having a clutch cylinder and a pressure-adjusting device, the pressure-adjusting device being a valve; and
       a shiftable throttle valve allocated to one or more shift elements of the plurality of hydraulically actuated shift elements, the shiftable throttle valve arranged between the respective clutch cylinder of the one or more shift elements and the respective pressure-adjusting device of the one or more shift elements, the shiftable throttle valve hydraulically connecting the respective pressure-adjusting device of the one or more shift elements to the respective clutch cylinder of the one or more shift elements,
    wherein the shiftable throttle valve is shiftable into at least a first shift position and a second shift position, a hydraulic resistance between the hydraulic transmission controller and the one or more shift elements of the plurality of hydraulically actuated shift elements being larger in the second shift position relative to the first shift position.

* * * * *